United States Patent
Sevim et al.

(10) Patent No.: US 9,597,927 B2
(45) Date of Patent: Mar. 21, 2017

(54) DIPPING METHOD APPLIED ON HYBRID CORDS

(71) Applicant: KORDSA GLOBAL ENDUSTRIYEL IPLIK VE KORD BEZI SANAYI VE TICARET ANONIM SIRKETI, Kocaeli (TR)

(72) Inventors: Dogan Sevim, Kocaeli (TR); Burak Ilgun, Kocaeli (TR); Yücel Ayyildiz, Kocaeli (TR)

(73) Assignee: KORDSA GLOBAL ENDUSTRIYEL IPLIK VE KORD BEZI SANAYI VE TICARET ANONIM SIRKETI, Kocaeli (TR)

( * ) Notice: Subject to any disclaimer, the term of this patent is extended or adjusted under 35 U.S.C. 154(b) by 20 days.

(21) Appl. No.: 14/424,441

(22) PCT Filed: Jan. 14, 2014

(86) PCT No.: PCT/TR2014/000004
§ 371 (c)(1),
(2) Date: Feb. 27, 2015

(87) PCT Pub. No.: WO2014/109724
PCT Pub. Date: Jul. 17, 2014

(65) Prior Publication Data
US 2015/0202925 A1 Jul. 23, 2015

(30) Foreign Application Priority Data
Jan. 14, 2013 (TR) .............................. a 2013 00468

(51) Int. Cl.
B05D 1/18 (2006.01)
B60C 9/00 (2006.01)
(Continued)

(52) U.S. Cl.
CPC ................ B60C 9/005 (2013.04); B05D 1/18 (2013.01); B05D 3/0254 (2013.01);
(Continued)

(58) Field of Classification Search
CPC .... B05D 1/18; B05D 3/0254; D06M 15/3562
See application file for complete search history.

(56) References Cited

U.S. PATENT DOCUMENTS 3,330,689 A * 7/1967 Ells ..................... D06M 15/693
156/910
3,968,295 A * 7/1976 Solomon .................... C08J 5/06
156/910
(Continued)

FOREIGN PATENT DOCUMENTS

EP 1703005 A1 9/2006
EP 2045379 A1 4/2009
(Continued)

OTHER PUBLICATIONS

Website capture of description of Mie Scattering via Wikipedia at: :https://en.wikipedia.org/wiki/Mie_scattering obtainined on Oct. 25, 2016.*

*Primary Examiner* — Nathan Empie
(74) *Attorney, Agent, or Firm* — Gokalp Bayramoglu

(57) ABSTRACT

The present invention relates to a dipping method applied on hybrid cords comprised of aramide and aramide-Nylon 6.6 fibers essentially comprising the steps of preparing the primary dipping solution (11), applying the primary dipping solution onto the cords (12), applying the primary heat treatment (13), preparing the secondary dipping solution (14), applying the secondary dipping solution onto the cords (15), applying the primary heat treatment (16), and used as a reinforcing material inside the rubber.

12 Claims, 1 Drawing Sheet

(51) Int. Cl.

| | |
|---|---|
| *C08J 5/06* | (2006.01) |
| *D06M 11/74* | (2006.01) |
| *D06M 15/356* | (2006.01) |
| *D06M 15/39* | (2006.01) |
| *D06M 15/41* | (2006.01) |
| *D06M 15/55* | (2006.01) |
| *D06M 15/693* | (2006.01) |
| *B05D 3/02* | (2006.01) |
| *D06M 101/34* | (2006.01) |
| *D06M 101/36* | (2006.01) |

(52) U.S. Cl.
CPC ............... *B60C 9/0042* (2013.04); *C08J 5/06* (2013.01); *D06M 11/74* (2013.01); *D06M 15/3562* (2013.01); *D06M 15/39* (2013.01); *D06M 15/41* (2013.01); *D06M 15/55* (2013.01); *D06M 15/693* (2013.01); *C08J 2321/00* (2013.01); *D06M 2101/34* (2013.01); *D06M 2101/36* (2013.01); *D06M 2200/50* (2013.01)

(56) References Cited

U.S. PATENT DOCUMENTS

| | | | |
|---|---|---|---|
| 4,409,055 A * | 10/1983 | Elmer | ............... C08J 5/06 156/307.5 |
| 6,511,747 B1 | 1/2003 | Cho et al. | |
| 6,886,320 B2 | 5/2005 | Rowan | |
| 2003/0130077 A1* | 7/2003 | Knutson | ............... B29D 29/08 474/260 |
| 2005/0017399 A1 | 1/2005 | Otto | |
| 2007/0137754 A1* | 6/2007 | Westgate | ............. B60C 9/0042 152/527 |
| 2009/0139630 A1* | 6/2009 | Mruk | ................... B60C 9/0042 152/547 |

FOREIGN PATENT DOCUMENTS

| | | | |
|---|---|---|---|
| EP | 2075360 A1 | | 7/2009 |
| JP | 2001030708 A | * | 2/2001 |
| JP | 2010047868 A | | 3/2010 |
| KR | 20110078153 A | | 7/2011 |

* cited by examiner

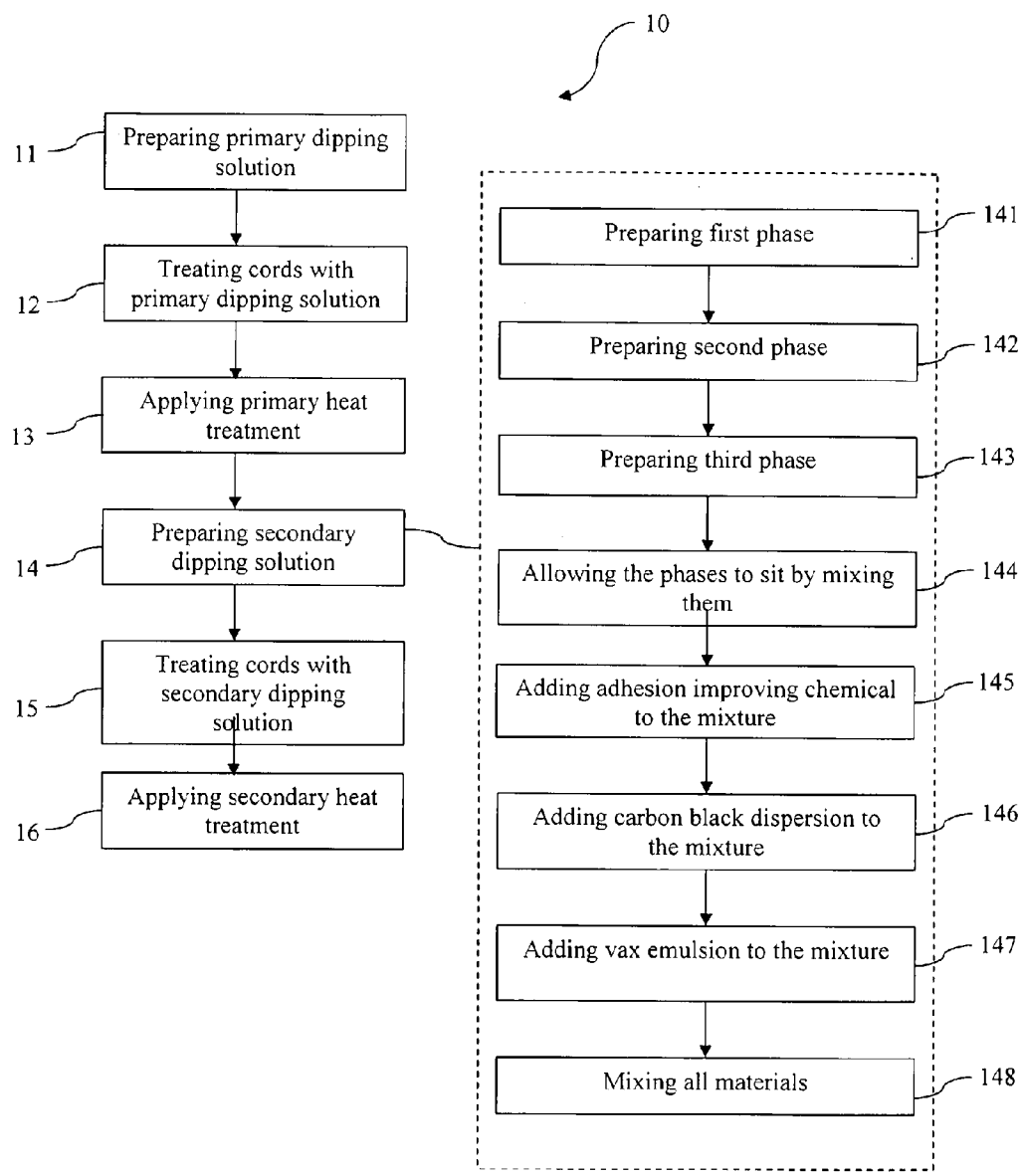

DIPPING METHOD APPLIED ON HYBRID CORDS

FIELD OF THE INVENTION

The present invention relates to a dipping method applied on hybrid cords comprised of aramide and aramide-Nylon 6.6 fibers used as reinforcing material in rubber.

BACKGROUND OF THE INVENTION

Today, adhesion of the hybrid cords comprised of aramide and aramide-Nylon 6.6 fibers is performed by using primary surface activating dipping solution before the main (secondary) dipping in addition to the dipping solution used for adhesion of Nylon 66 cords. The chemical increasing the wetting ability of the surface and the chemical increasing the surface activity are dissolved in water during primary dipping within the surface activating dipping. In secondary dipping, the dipping solution (RFL) comprised of resorcinol, formaldehyde and latex mixture is used. Furthermore, there are applications wherein the carbon black dispersion is added into the secondary dipping.

In the state of the art, after the primary dipping, heat treatment is applied for 60-75 seconds at 240-249° C. After the secondary dipping, the cords are treated with heat treatment for 60-75 seconds again at 240-249° C.

All these processes are performed to provide the adhesion of the fibers used as rubber reinforcing material onto the rubber. For this reason, in order to provide the desired adhesion, the fibers are coated with special dipping, chemicals and cooked by dipping. Aramid and aramid-Nylon 66 hybrid cords dipped with the said method exhibit 60-70% lower adhesion than the cords comprised of Nylon 66 fibers. This ratio is not enough especially in aramid and aramid-Nylon 66 hybrid cords used as cap ply strip in pneumatic tires. Because of the inadequate adhesion, layer separation at high speeds tire rupture accordingly is seen in tire cap ply.

It is not possible to manufacture bias truck tire with aramid and aramid-Nylon 66 hybrid cords dipped with the methods known today. Low adhesion values of the said cords limit the field of use as rubber reinforcing material.

The adhesion of aramid and aramid-Nylon 66 hybrid cords onto the rubber is partially provided with the known technique. By this means, in various applications, the said cord structures are used as reinforcing materials. The surface of the cords are activated with the surface activating material (epoxy) in primary dipping, the fibers are enabled to form chemical bond with the RFL solution in secondary dipping. Carbon black dispersion also increases the adhesion mechanically.

In the state of the art, the material increasing the wetting, ability of the surface (aerosol) used in first dipping decreases the activity of the surface activating material (epoxy) present in first dipping solution, and causes the RFL to break and separate from the cord surface after heat treatment process. In addition to surface wetting agent, caustic (NaOH) solution used for adjusting the pH of the first dipping solution also decreases the activity of the epoxy and reduces the surface adhesion ability. Furthermore, crustation and cracking is seen on the surface of the cord treated with heat for long time at high temperature after the primary dipping, and the crusted layer breaks and separates from the surface of the cord.

Besides, in the state of the art, the particle size of the carbon black dispersion in secondary dipping is in the range of 3-4 mm. Since this particle size cannot provide homogenous. distribution, the activity of the carbon black particles expected to increase the adhesion mechanically decreases. This causes the adhesion values on the cord treated with dipping to vary along the cord. High temperature and long term heat treatment applied after the secondary dipping cause the. RFL layer comprising carbon black to be cracked and crusted and separated from the cord surface. In RFL solutions not comprising carbon black, the said negative effect is seen 40-50% more.

SUMMARY OF THE INVENTION

The objective of the present invention is to provide a dipping method applied on hybrid cords wherein the activity of the surface activating agent is increased.

Another objective of the present invention is to provide a dipping method applied on hybrid cords wherein the adhesion values are uniform along the cord and the width of the fabric by means of the carbon black dispersion with high homogeneity.

A further objective of the present invention is to provide a dipping method applied on hybrid cords wherein the heat treatment time is shortened relative to the state of the art and thus the crustation and cracking of the dipping solution which is applied is prevented.

BRIEF DESCRIPTION OF THE DRAWING

A dipping method applied on hybrid cords developed to fulfill the objectives of the present invention is illustrated in the accompanying figure, wherein FIG. 1 is the view of the flowchart of the method.

DETAILED DESCRIPTION OF THE INVENTION

A dipping method applied on hybrid cords (10) developed to fulfill the objective of the present invention comprises the steps of
- preparing the primary dipping solution (11),
- applying the primary dipping solution on cords (12),
- applying primary heat treatment (13),
- preparing the secondary dipping solution (14)
- preparing the first phase (141)
- preparing the second phase (142)
- preparing the third phase (143)
- allowing the phases to sit by mixing them (144),
- adding adhesion improving chemical to the mixture (145),
- adding carbon black dispersion to the mixture (146),
- adding wax emulsion to the mixture (147),
- mixing all the materials (148),
- applying the secondary dipping solution on cords (15),
- applying the secondary heat treatment (16).

In the inventive dipping method applied on hybrid cords (10), first epoxy and water are mixed, and primary dipping solution to be applied on hybrid cords comprised of aramid and aramid-Nylon 66 is prepared (11). With this purpose, water in ratio of 97-98% by weight and epoxy in ratio of 2-3% are mixed together. Being different from the previous art, in primary dipping solution, aerosol and sodium carbonate solution is not used.

The primary dipping solution which is prepared is applied on hybrid cords with immersing method (12). In the preferred embodiment of the invention, the hybrid cords comprised of aramid and aramid-Nylon 66 fibers are kept inside the primary dipping solution for 0.2-5 seconds.

After the primary dipping solution is applied on the hybrid cords (12), the said cords are subjected to heat treatment for 60 seconds maximum and at maximum 240° C. (13). In the preferred embodiment of the invention, the primary heat treatment (13) is applied for 15-45 seconds at the range of 215-230° C.

First, three different phases are prepared in order to prepare the secondary dipping solution (14). During preparing the first phase (141), water, 28% aqueous ammonium hydroxide solution and 75% resorcinol-formaldehyde aqueous solution are mixed. In the preferred embodiment of the invention, there is water in the range of 75-85% by weight, 28% ammonium hydroxide aqueous solution in the range of 3-5% by weight, 75% resorcinol-formaldehyde aqueous solution in the range of 10-15% by weight present inside the first phase.

Water and 41% vinyl pyridine latex emulsion are mixed together to prepare the second phase (142). In the preferred embodiment of the invention, there is water in the range of 5-10% by weight, and 41% vinyl pyridine latex emulsion in the range of 90-95% by weight present inside the second phase.

Water and 37% formaldehyde solution are mixed in order to prepare the third phase (143). In the preferred embodiment of the invention, there is water in the range of 70-85% by weight, and 37% formaldehyde in the range of 15-30% by weight present inside the third phase.

The said three different phases which are prepared are mixed together in ratios of 2.7:4.4:1 by weight and allowed to sit for 10-14 to grow mature (144). Then, adhesion improving agent/agents in 1-5% of the composition is/are added to the said composition (145).

After the adhesion improving agents are added, 25% aqueous solution of carbon black dispersion in 10-20% by weight of the composition is added (146). The particle size of the carbon black dispersion is between 0.1 and 0.4 micrometer, 0.2-0.35 micrometer sizes are the most preferred particle sizes.

After the whole composition is stirred homogenously 95% wax emulsion in 3-5% by weight of the composition is added (147) and the final composition is continuously stirred for an hour (148).

The secondary dipping solution, which is obtained after all materials are mixed (148), are applied on hybrid cords, on which the primary dipping solution is applied, with immersing method (15). In the preferred embodiment of the invention, the cords are kept inside the. secondary dipping solution for 0.2-5 seconds.

After the secondary dipping solution is applied on the hybrid cords (15), the said cords are subjected to secondary heat treatment for 60 seconds maximum and at maximum 240° C. (13). In the preferred embodiment of the invention, the secondary heat treatment (13) is applied for 15-45 seconds at the range of 225-240° C.

The dipping solutions and heat treatment applications disclosed within the scope of the present invention can be used in all embodiments wherein the hybrid cords comprised of aramid and aramid-Nylon 66 fibers used as reinforcement material are present. The hybrid cords prepared with the inventive dipping method (10) are preferably present as reinforcing materials in vehicle tires, hoses and conveyor belts.

The reinforcing fabrics comprised of cords dipped with the inventive dipping method applied on hybrid cords (10) have the width of 100 to 200 cm, preferably 120 to 160 cm. The cord number per decimeter of the said rubber reinforcing fabrics is 50 to 80, preferably 60 to 150.

Aerosol (surface wetting agent) and caustic soda (pH adjuster) present in the primary dipping solution in the state of the art are removed from the primary dipping solution composition in the inventive dipping method (10). Therefore, the activity of the epoxy which is a surface activating agent is enabled to be increased. Furthermore, the temperature used for primary heat treatment (13) after the primary dipping solution is applied (12) is reduced in ratio of 5-10% than the value in the state of the art, and the time of the heat treatment is reduced 50-60%. Therefore, the problem of crusting and breaking on the cord caused by the high temperature and heat treatment for long time is prevented.

In the inventive method (10), the particle size of the carbon black dispersion used in the secondary dipping solution is also reduced to the one twentieth (1/20) of the particle size used in the state of the art. By this means, the homogeneity of the carbon black dispersion is increased, and the adhesion values are enabled to be uniform along the cord and the width of the fabric. Besides, the temperature of the heat treatment applied after the secondary dipping is reduced in ratio of 7-10%, and the time of the heat treatment is reduced in ratio of 50-60%. By this means the crustation and cracking of RFL solution present in the secondary dipping solution and separation from the cord surface is prevented, and the treatment temperature of RFL layer is kept under the maturation temperature so that the complete maturation is realized inside the rubber.

With all these changes, the adhesion values of hybrid cords comprised of aramid and aramid-Nylon 66 onto the rubber is increased 33% relative to all techniques known in the state of the art. Therefore, in all embodiments wherein cords comprised of only Nylon6 and Nylon 66 fibers are used as reinforcing material, the hybrid cords comprised of aramid and aramid-Nylon 66 fibers are enabled to be used as reinforcing material.

Within the framework of these basic concepts, it is possible to develop various. embodiments of the inventive dipping method applied on hybrid cords (10). The invention cannot be limited to the examples described herein and it is essentially as defined in the claims.

The invention claimed is:

1. A dipping method applied on hybrid cords comprised of aramid and aramid-Nylon 66 fibers used as reinforcing material inside rubber, comprising:
    preparing primary dipping solution, wherein the primary dipping solution is comprised of epoxy and water, and does not comprise aerosol or sodium carbonate;
    applying the primary dipping solution on the hybrid cords;
    applying primary heat treatment, wherein the heat treatment is applied for 15-45 seconds at the range of 215-230° C.;
    preparing secondary dipping solution, wherein the preparing secondary dipping solution comprises:
        preparing a first phase,
        preparing a second phase,
        preparing a third phase,
        mixing said phases and allowing a mixture of said phases to sit,
        adding adhesion improving chemical to said mixture,
        adding carbon black dispersion to the mixture, wherein the particle size of the dispersion is between 0.2 and 0.35 micrometer to increase homogeneity and enable adhesion values to be uniform along the hybrid cords, adding wax emulsion to the mixture,
        mixing all the materials;

applying the secondary dipping solution on the hybrid cords;

applying a secondary heat treatment, wherein the secondary heat treatment is applied for 15-45 seconds in the range of 225-240° C.

2. The dipping method applied on hybrid cords according to claim 1, wherein, during the step of preparing primary dipping solution, water in ratio of 97-98% by weight and epoxy in ratio of 2-3% are mixed.

3. The dipping method applied on hybrid cords according to claim 1, wherein, during the step of applying the primary dipping solution on cords, the hybrid cords comprised of aramid and aramid-Nylon 66 fibers are dipped into the primary dipping solution and kept therein for 0.2-5 seconds.

4. The dipping method applied on hybrid cord according to claim 1, wherein, during the step of preparing the first phase, water in the range of 75-85% by weight, 28% ammonium hydroxide aqueous solution in the range of 3-5% by weight, 75% resorcinol-formaldehyde aqueous solution in the range of 10-15% by weight are mixed.

5. The dipping method applied on hybrid cords according to claim 4, wherein, during the step of preparing second phase, water in ratio of 5-10% by weight and 41% vinyl pyridine latex emulsion in ratio of 90-95% by weight are mixed.

6. The dipping method applied on hybrid cords according to claim 5, wherein, during the step of preparing third phase, water in ratio of 70-85% by weight and 37% formaldehyde solution in ratio of 15-30% by weight are mixed.

7. The clipping method applied on hybrid cords according to claim 6, wherein, during the step of mixing said phases and allowing a mixture of said phases to sit, the first, second and third phases are mixed in ratio of 2.7:4,4:1 respectively by weight, and allowed to sit for 10-14 hours for maturation.

8. The dipping method applied on hybrid cords according to claim 1 wherein, during the step of adding carbon black dispersion to the mixture, 25% aqueous solution of carbon black dispersion in ratio of 10-20% of the composition of the mixture by weight is added into the composition of the mixture.

9. The dipping method applied on hybrid cords according to claim 1 wherein the step of adding wax emulsion to the mixture, 95% wax emulsion in ratio of 3-5% of the composition of the mixture by weight is added.

10. The dipping method applied on hybrid cords according to claim 3 wherein the step of adding wax emulsion to the mixture, 95% wax emulsion in ratio of 3-5% of the composition of the mixture by weight is added.

11. The dipping method applied on hybrid cords according to claim 1 wherein, during the step of mixing all materials, final composition is continuously stirred for at least 1 hour.

12. The dipping method applied on hybrid cords according to claim 3 wherein, during the step of applying the secondary dipping solution on cords, hybrid cords comprised of aramid and aramid-nylon 66 fibers, on which the primary dipping solution is applied, are dipped into the secondary dipping solution and kept therein for 0.2-5 seconds.

\* \* \* \* \*